United States Patent [19]

Brennan

[11] 4,254,924
[45] Mar. 10, 1981

[54] AIRCRAFT SEAT

[75] Inventor: Edward J. Brennan, Litchfield, Conn.

[73] Assignee: Koehler-Dayton, Inc., New Britain, Conn.

[21] Appl. No.: 42,341

[22] Filed: May 25, 1979

[51] Int. Cl.³ .............................................. B64D 11/06
[52] U.S. Cl. ................................ 244/122 R; 297/353; 297/378
[58] Field of Search ..................... 244/122 R; 297/331, 297/353, 378, 379; 296/65 R

[56] References Cited

U.S. PATENT DOCUMENTS

| 2,927,818 | 3/1960 | Ferrara | 297/378 X |
| 3,193,326 | 7/1965 | Smith | 297/378 X |
| 4,045,082 | 8/1977 | Egert et al. | 297/379 |

FOREIGN PATENT DOCUMENTS 1555563 10/1969 Fed. Rep. of Germany ........... 297/331

Primary Examiner—Barry L. Kelmachter
Attorney, Agent, or Firm—Spencer T. Smith

[57] ABSTRACT

An aircraft seat having a pivotal seat back which has an upright position for occupancy and an advanced position for affording additional living space to the passenger occupying the next rearward seat including a detent mechanism to maintain the seat back in either of its positions and to allow passenger adjustment of the seat back between these two positions.

2 Claims, 2 Drawing Figures

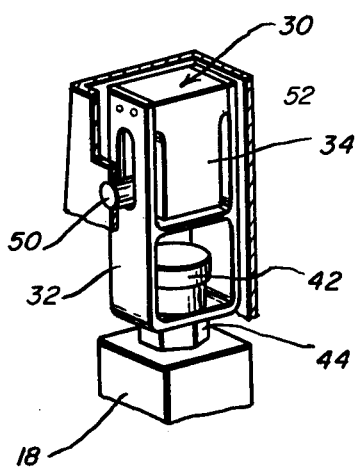
Fig_2
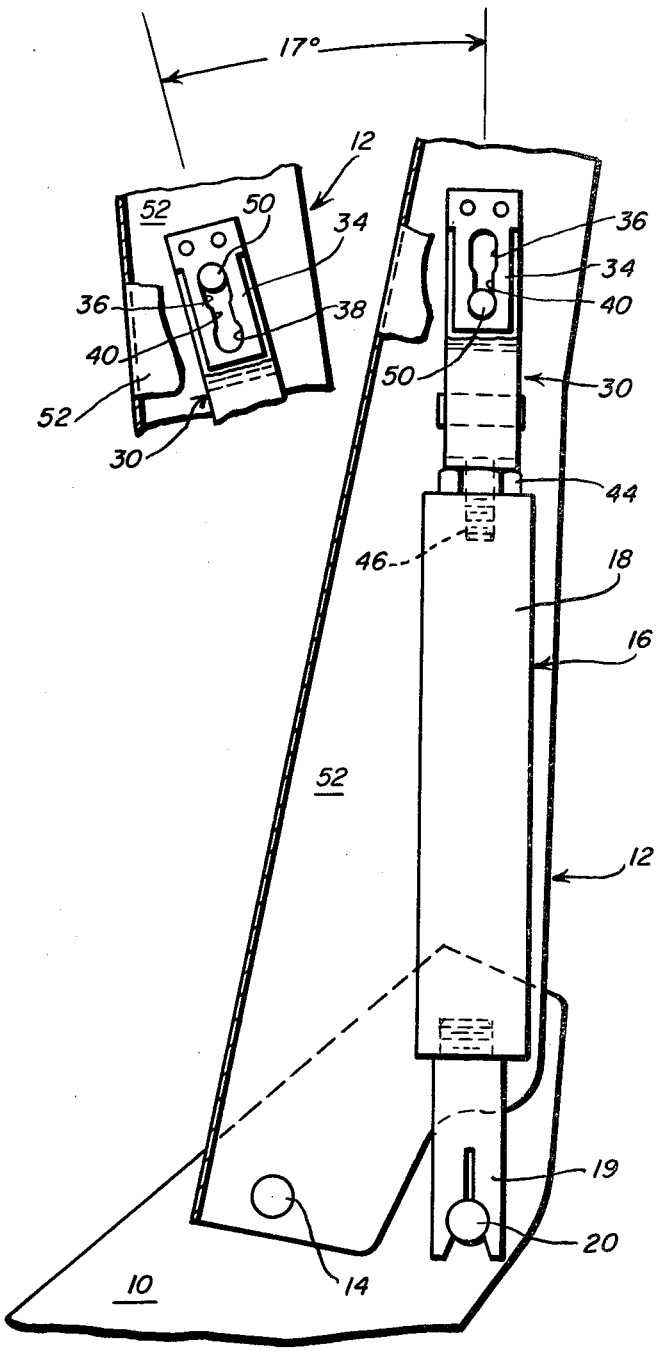
Fig_1

AIRCRAFT SEAT

The present invention relates to vehicular seats, and more particularly, to aircraft seats.

It is an object of the present invention to provide a seat back which can be easily pivoted forward from its full upright position to a position a selected number of degrees forward thereof to provide more space for the occupant of the next rearward seat when the seat is unoccupied, yet will automatically return to its full upright position whenever the seat is occupied.

Other objects and advantages of the present invention will become apparent from the following portion of this specification and from the accompanying drawing which illustrates, in accordance with the mandate of the patent statutes, a presently preferred embodiment incorporating the principals of the invention.

Referring to the drawing:

FIG. 1 is a side elevational view, in cross section, of an aircraft or other vehicular seat; and FIG. 2 is an oblique view of a portion of the seat back illustrated in FIG. 1.

An aircraft seat has two basic components: the seat 10 and the seat back 12 which are joined at a suitable shaft 14 for relative pivotal movement.

The position of the seat back is controlled by a mechanism 16 including a cylinder member 18 having a bifurcated latch mechanism 19 at one end for selectively latching onto a catch or breakout pin 20 secured to the seat framework at a location spaced from shaft 14.

To the other end of the cylinder 18 is connected an upper lock attachment mechanism 30 which includes a yoke 32 to which is secured a detent 34. The detent 34 is made of nylon or the like and includes top 36 and bottom 38 openings joined by a reduced section 40. The yoke 32 is joined by the cylinder 18 by a bolt 42 which passes through a suitable opening in the base of the yoke, through a nut 44 which provides some degree of adjustability and into a threaded bore 46 at the top of the cylinder.

A pin member 50, which is secured to parallel side walls 52 of the seat back frame, is contained within the detent.

The normal position of the seat back is the substantially vertical position which is shown in FIG. 1. The pin member is located within the bottom detent opening 38 when the seat back is in this full upright position. When the seat is vacant, the seat back can quickly and easily be pivoted forward by a selected amount, such as 17°, simply by pushing the seat back forward. The pin member pushes easily through the reduced diameter detent section 40 and to the top of the upper opening 36 where it will be maintained by the normal tendency of the seat back so inclined to fall further forward.

The reduced diameter section is just slightly smaller than the pin member and presents little resistance due to the resilient character of the nylon detent when the pin member is forced therethrough. As a result, as soon as the seat is occupied, the force of an occupant's back against the seat back, which normally occurs consequent to his sitting in the seat, the seat back will revert to its full upright position. When the seat is unoccupied and the passenger in the seat next rearward seat wants more space, a slight forward push on the seat back will force the pin member 50 through the reduced section and into the upper opening 36. The detent will maintain the seat back in this position.

When a person occupies this seat, a slight rearward push will restore the seat back to its intended vertical position.

To fully collapse the seat back, a very substantial forward force equal to the force required to release the catch from the latch must be applied. The seat back may then be rotated about its pivot until it assumes a position on top of the seat.

What is claimed is:

1. A seat for a vehicle comprising:
   a seat bottom,
   a seat back mounted on said seat bottom for pivotal movement relative thereto,
   means for pivotally locating said seat back at an upright sitting position including
      linkage means mounted at one end on said seat bottom for pivotal movement relative thereto,
      a pin member secured to said seat back,
      said linkage means having at a second end block means having a first aperture defined therein for receiving and containing said pin member,
   means for pivotally locating said seat back at a forward dress-up position where said seat back interferes with the occupation of said seat thereby enlarging the living space of the next rearward seat including said block means having a second vertically upwardly spaced aperture for receiving and containing said pin member, and
   means for permitting the relocation of said seat back from said sitting position to said dress-up position and vice versa upon the application of a predetermined force smaller than the force normally applied by a person sitting down in the seat so that said seat back located at the dress-up position will be automatically relocated to said sitting position by a person sitting in said seat including
   said block means having a channel interconnecting said first and second apertures having a selected width smaller than said pin member for preventing the relocation of the seat back until the predetermined small force has been applied.

2. A vehicular seat according to claim 1, wherein said block means is made of nylon.

* * * * *